United States Patent [19]

Turner

[11] 4,094,630
[45] June 13, 1978

[54] WELDING FLUX CURING APPARATUS

[75] Inventor: James Franklin Turner, Signal Mountain, Tenn.

[73] Assignee: Combustion Engineering, Inc., Windsor, Conn.

[21] Appl. No.: 721,633

[22] Filed: Sep. 8, 1976

[51] Int. Cl.² .............................................. F27B 9/14
[52] U.S. Cl. ..................................... 432/134; 34/164; 432/146
[58] Field of Search ................. 432/31, 133, 134, 135, 432/146, 147; 34/39, 164

[56] References Cited

U.S. PATENT DOCUMENTS

| 3,277,585 | 10/1966 | Cook et al. | 34/164 |
| 3,432,397 | 3/1969 | Berg | 34/39 |
| 3,517,914 | 6/1970 | Smith | 432/134 |
| 3,542,349 | 11/1970 | Shimotsuma et al. | 432/31 |
| 3,701,670 | 10/1972 | Pierce | 34/164 |

FOREIGN PATENT DOCUMENTS 736,883  7/1943  Germany .............................. 432/134

*Primary Examiner*—John J. Camby
*Attorney, Agent, or Firm*—Edward L. Kochey, Jr.

[57] ABSTRACT

An apparatus for curing bonded welding flux wherein the flux is passed along a series of vibrating inclined planes. Gas fired radiant heaters are positioned above the planes to heat the flux, with combustion gases and vapor driven off the flux passing upwardly between the radiant heaters and the flux covered planes.

6 Claims, 2 Drawing Figures

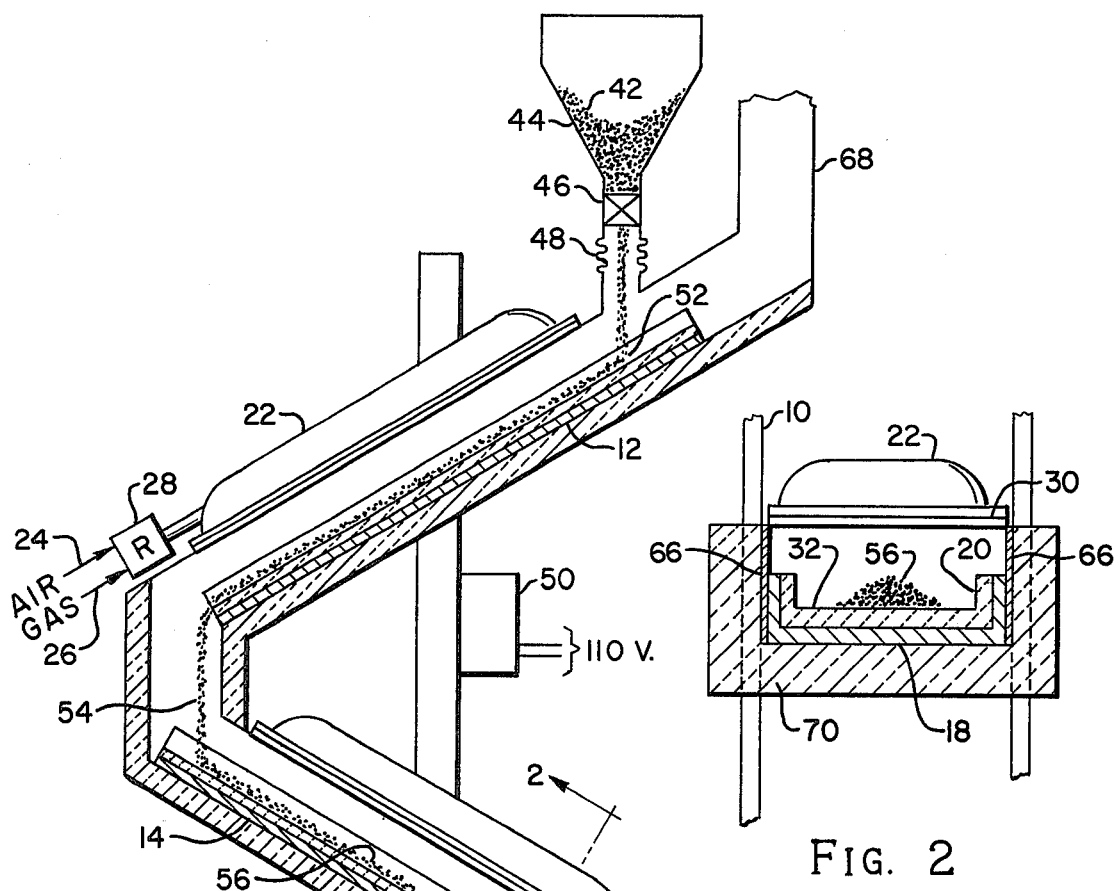
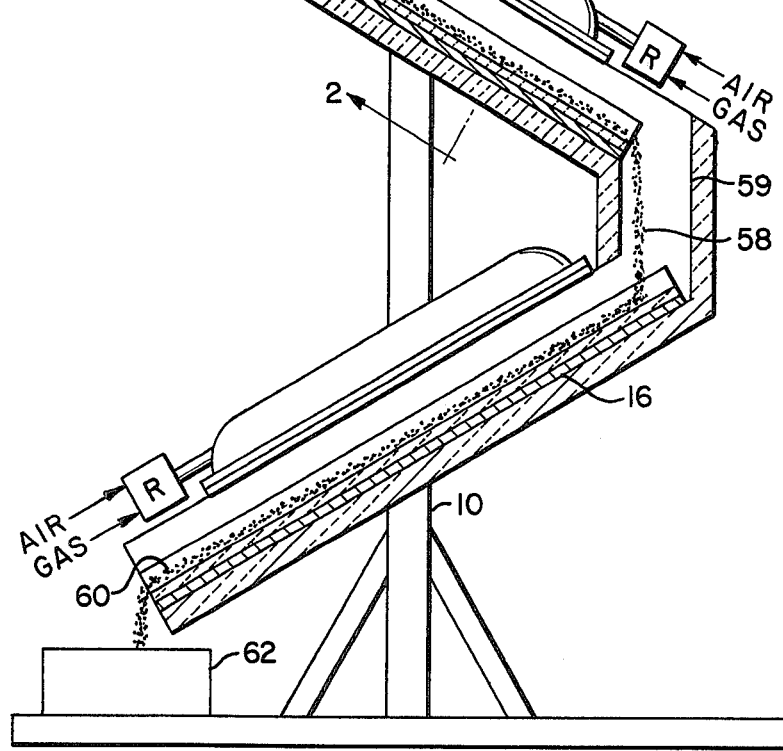
FIG. 2
FIG. 1

WELDING FLUX CURING APPARATUS

BACKGROUND OF THE INVENTION

Welding fluxes are generally in one of three forms. They may be either fused, agglomerated or bonded.

The fused is formed by melting the flux at temperatures between 2700 and 3100 F before chilling and fragmenting the flux. The agglomerated flux has a ceramic binder which is cured at temperatures of about 2550 F. In producing a bonded flux, the raw materials are ground, dry mixed and then bonded together with the addition of potassium silicate or sodium silicate. The mixture is then pelletized and cured at relatively low temperature to drive off the moisture. Due to the relatively low temperature of the curing, metallic deoxidizers and ferroalloys can be included in the flux, without being destroyed by high temperature curing. One disadvantage of the bonded flux is that it is more likely to absorb moisture than the other types and a second disadvantage is that removal of fines, either willfully or inadvertently, will effect some alteration of the flux composition which does not occur with the other type fluxes.

The conventional method of curing the pelletized bonded flux comprises feeding the material into a high heat rotary kiln. This process takes approximately 40 minutes from the time the flux enters the kiln until exit. Due to the tumbling action within the kiln and the velocity of gases passing through the kiln, many of the fines are inadvertently removed during this process. This is sometimes minimized by making large pellets, which then requires subsequent grinding to the desired size.

Rotary kilns tend to be relatively massive and less than conveniently portable. They are costly in maintenance and fuel consumption and a typical kiln has to be fired for a period of 18 to 24 hours so that the temperature can be brought up gradually. Since these disadvantages occur even in small kilns it has been the tendency to restrict operations to large size kilns which handle a large volume of flux in a single batch.

SUMMARY OF THE INVENTION

My invention comprises a series of inclined planes which cascade the flux from one plane to the other. The rate of flow of flux across this plane may be regulated by regulating a vibrator which vibrates the planes or by adjusting the inclination of each plane. The flux is cured by radiantly heating the flux from above as it traverses the vibrating inclined planes. The space between the radiant means and the inclined plane may be enclosed by side plates to form a passageway for natural convection of air, and for exhaust gases where gas fired radiant heaters are used. The passageway over each plane may be serially connected with that of the other planes.

This apparatus may be more rapidly heated up than rotary kilns and is suitable for either small or large batches. It will process flux more rapidly and is more portable than a kiln for a comparable capacity.

The radiant heating permits good heat transfer to the flux without high gas velocities or agitation so that loss of fine material is minimized. The serial flow through different heating means permits the use of different temperatures at each location so that a lower temperature may be used as the flux approaches dryness, thereby minimizing burnout of elements in the flux while still obtaining a relatively high heating rate for rapid curing. It has also been found that the use of a radiant heat source at a relatively high temperature level for bonded flux, say 1400° F to 1800° F, produces a stronger flux which is less subject to fragmentation during shipping than is that cured at lower temperature levels. Other advantages of the invention will become apparent to those skilled in the art as the description proceeds.

BRIEF DESCRIPTION OF THE DRAWINGS

FIG. 1 is a sectional side elevation of the flux curing apparatus; and

FIG. 2 is a sectional view taken through one level of the apparatus.

DESCRIPTION OF THE PREFERRED EMBODIMENT

Referring to FIG. 1, structural support 10 supports upper inclined plane 12, intermediate inclined plane 14, and the lower inclined plane 16. Each of the inclined planes comprises a metal support plate 18 which may be welded to the support 10 and a ceramic insert plate 20 of a heat resisting material such as quartz.

A gas fired radiant heater 22 is supported from the support 10 parallel to each of the inclined planes. This heater includes an air inlet 24, a gas inlet 26 and a regulator 28 which controls the air gas mixture into the heater. The heater includes a fine mesh screen 30 with a gas burning on the discharge side of the screen. The screen may be maintained at any desired temperature level by appropriate regulation of regulator 28. The distance between the radiating screen 30 and the inner surface 32 of the ceramic plate is one and one-half inches.

Feed of the uncured flux 42 from hopper 44 is controlled by regulating gate 46. The flux passes through expansion joint 48 falling on inclined plane 12. Vibrator 50 vibrates the inclined planes so that the flux delivered to them traverses these planes at a rate which may be controlled by the frequency or stroke of the vibrator. A layer of flux 52 is therefore formed on the upper inclined plane 12 with the flux moving downwardly to the lower end of the plane. The lower end of the upper plane is located above the upper portion of the inclined plane 14 whereby the flux forms a free falling stream 54 to the intermediate plane 14. A layer of flux 56 is formed on this plane passing to the lower end of the plane which is located above the upper portion of inclined plane 16. The flux falls freely in stream 58 to the lower inclined plane 16. A flux layer 60 is formed on the lower inclined plane as the flux moves across this plane cascading into a discharge bin 62.

Each of the inclined planes has a side plate 66 on each side connecting the inclined plane to the radiant heater 22. This forms an unobstructive passageway through which exhaust gases from the gas fired heater and vapor driven off from the flux will pass. Four sided connecting ducts 58 join the upper end of each plane with the lower end of the plane thereabove so as to form a continuous passageway above the three inclined planes. The upper passageway is connected to a stack 68. In addition to the exhaust gases and vapor driven off, a natural convection current of air passes upwardly and serially through the passageways and through the discharge stack.

Insulation 70 covers the underside of the inclined plane and the side plate as well as the vertical duct work to retain heat within the apparatus. The radiant heater 22 is not insulated since the high temperature which would result in the heater 22 would cause it to malfunction.

In a working model which has been tested, the inclined planes were each 4 inches wide and 28 inches long. The angle of repose of the flux to be cured was 28 ½°  and the angle from horizontal used for the inclined planes was 27 ½°. The entire structure was vibrated by an adjustable vibrating means 50, although it is necessary only that the inclined planes itself be vibrated. Retention time in the apparatus is three to five minutes, with an output of 600 pounds per hour.

The preferred operating temperature of the radiating screen is 1600° F. Temperatures from 1000° F to 1800° F are acceptable but the lower temperature increases the required traverse time and also results in a cured flux which is more frangible than the flux cured at a higher temperature.

1800° F is believed to be about the highest acceptable temperature. At temperatures beyond this, there will be a tendency for some of the flux additives to oxidize. The use of the high temperature, however, has been found to produce a flux which is more suitable for shipping without the particles crumbling. Accordingly, 1600° F is the preferred temperature at which the radiating body should operate.

The preferred spacing of the radiating body from the inclined plane is 1½ inches. If the distance is significantly less than this, the velocity of gases passing along the inclined plane increases and accordingly, the tendency to entrain fine particles will increase. On the other hand, should the distance significantly exceed 1½ inches, the radiant energy is dissipated due to absorption of heat in the moisture and in the gas passing through the passageway.

The cascading action of the flow stream 54 and 58 reverses any layering that might occur in the flux and permits the flow of hot air and gases to bathe the flux. During the freefall, the entire surface of the flux particles is exposed, thereby increasing the effectiveness of release of vapor from the surfaces. The use of radiant heating permits the apparatus to be more rapidly warmed for starting, since the heat is to be directed only at the flux itself. However since the flux will also transfer heat in turn to the inclined plane material during operation, the material must be prewarmed. There will be some limitation on heat-up rate, depending on the material used. It has been found that the test apparatus can be brought up to temperature in less than 40 minutes with no deleterious effect on any of the equipment.

The use of radiant heating produces a heating method wherein very little force is exerted on flux particles due to flow of air or other gases. Accordingly, the fine material in the flux is retained with only rejection being that which may be willfully made in screening after curing. It has been reported that with bonded flux, the fine material will have a different chemical composition, although the problem may be initiated due to the pelletizing method used, the retention of the fines assures the uniformity of a cured flux. Normally, the only rejection of material would be that which passes through a 200 mesh screen.

While the inclined planes are shown at a fixed angle, it is preferable that they be made adjustable so that depending on the consistency of the flux to be cured, better control can be effected over the flow rate. Normally the inclined plane should be at an angle slightly less than the angle of repose of the material to be cured.

Since the material to be cured is very moist in the upper inclined plane 12 but rather dry as it reaches the lower inclined plane 16, different temperatures of the radiating source may be used. For instance, a radiating source at 1800° F may be used at the upper level with 1600° F being used at the intermediate level and 1200° F being used at the lower level. This will decrease the possibility of inadvertent burnout of oxidizable additives.

While the preferred embodiment has been described with three planes, a greater number may be used.

What is claimed is:

1. An apparatus for curing bonded welding flux comprising:
   a. an upper inclined plane;
   b. at least one intermediate inclined plane;
   c. a lower inclined plane, each of said planes inclined at an angle less than the angle of repose of material being cured;
   d. a support supporting said inclined planes with the lower end of said upper plane over an upper portion of the intermediate plane and the lower end of said intermediate plane over the upperportion of said lower plane;
   e. means for vibrating said inclined planes;
   f. means for feeding uncured flux to the upper portion of said upper inclined plane, whereby the flux traverses said inclined planes;
   g. heating means for radiantly heating the flux as it traverses throughout a substantial portion of each of said inclined planes, said heating means being above and parallel to each of said inclined planes; and
   h. side plates joining each of said inclined planes with its respective heating means, whereby a flow passage is formed therebetween, the flow passage being substantially unrestricted throughout its length.

2. An apparatus as in claim 1 wherein said inclined planes lie in a common plane and each succeeding plane extends downwardly in the opposite direction.

3. An apparatus as in claim 1 having also duct means joining said heating means, said inclined plane and said side plates at adjacent ends of said inclined planes, whereby a serial continuous flow passage is formed over said inclined planes.

4. An apparatus as in claim 3 wherein said heating means comprises gas fired radiant heaters, and wherein the exhaust gases from said gas fired heater pass through the continuous passage.

5. An apparatus as in claim 4 wherein the radiating portion of said heating means is at a temperature between 1400° F and 1800° F.

6. An apparatus as in claim 5 wherein said heating means is located at a distance between 1 and 2 inches from the upper surface of said inclined plane.

* * * * *